United States Patent [19]
Maynard

[11] 3,935,432
[45] Jan. 27, 1976

[54] VARIABLE COLOR LABEL FOR OBJECT IDENTIFICATION SYSTEM

[75] Inventor: Robert L. Maynard, Huntington Bay, N.Y.

[73] Assignee: Servo Corporation of America, Hicksville, N.Y.

[22] Filed: Jan. 10, 1975

[21] Appl. No.: 540,128

[52] U.S. Cl. ................ 235/61.12 N; 235/61.11 E; 340/146.3 K
[51] Int. Cl.² .................... G06K 19/06; G06K 7/12
[58] Field of Search ................... 250/268, 269, 270; 235/61.11 E, 61.12 N, 61.7 B, 61.7 R; 340/146.3 K, 147; 23/230 LC; 161/5

[56] References Cited
UNITED STATES PATENTS

| | | |
|---|---|---|
| 3,553,433 | 1/1971 | Sorli ............................ 235/61.7 R |
| 3,594,126 | 7/1971 | Fergason ....................... 23/230 LC |
| 3,620,889 | 11/1971 | Baltzer .................................. 161/5 |
| 3,639,731 | 2/1972 | McNeill ....................... 235/61.11 E |

*Primary Examiner*—Daryl W. Cook
*Assistant Examiner*—Robert M. Kilgore
*Attorney, Agent, or Firm*—Kane, Dalsimer, Kane, Sullivan and Kurucz

[57] ABSTRACT

An improved label is provided for use in a system for the identification of objects wherein the label is affixed to an object to be identified. The label comprises an array of modules of colored elements arranged in a code to define data unique to the object and means on the label for altering the color of at least a portion of one of the modules in response to a condition to which the object is subjected.

18 Claims, 5 Drawing Figures

VARIABLE COLOR LABEL FOR OBJECT IDENTIFICATION SYSTEM

BACKGROUND OF THE INVENTION

The present invention relates to object identification systems and in particular to an improved label for use in such systems wherein the coding on the label is adapted to vary in response to a change in conditions to which the object being identified is subjected or within the object.

In U.S. Pat. No. 3,225,177 which is commonly assigned with the present application, a system for the automatic identification of objects is disclosed. The commercial form of the invention is marketed under the trade name KARTRAK by the Servo Corporation of America of Hicksville, N.Y. The KARTRAK system is the American Association of Railroads approved form of railroad car identification and, accordingly, virtually every freight car in the United States is furnished with a KARTRAK label.

The label comprises a plurality of stripes formed of retroreflective material arranged in a two-position, base four code. At various sites, such as freight yards, terminals, etc. scanners are provided which, in effect, "read" the labels to decipher alpha-numeric data identifying the cars. In this manner, automated surveillance can be maintaind of the millions of railroad cars across the country.

The KARTRAK labels comprise a vertical array of modules of parallel, horizontal stripes, each module having two horizontal stripes. The fields are colored blue, orange, or black (the absence of blue or orange) and white (the presence of both blue and orange). The modules are coded to contain information as to the car identification number, carrier identification code and equipment code as well as control modules which generate a start signal, a stop signal, and parity check code. The standard KARTRAK label contains 13 color coded modules.

In addition to their use on railroad cars, the KARTRAK labels are also used on containers, truck trailers and the like. Indeed, such color coded labels can be and are used in many other types of object identification systems. One of the principal advantages of the KARTRAK and similar systems is that the object may be moving while its label is being scanned and decoded.

Oftentimes, the environment within or about an object to which a label is affixed is critical. A dramatic example of this is the common refrigerator car where it is essential that the temperature within the car be maintained below a certain temperature. To this end, the car is equipped with the necessary refrigeration equipment. Similarly, there are other cars wherein the temperature must be maintained above a certain temperature; wherein the pressure must be maintained above or below certain critical values; wherein the container must be maintained airtight or constant air circulation must be maintained, etc.

The principal object of the present invention is to provide an improved label of the type discussed above which not only contains basic identification information but additionally provides constant monitoring of the object and generates a signal to an associated scanning station indicative of an abnormal condition within or associated with the object. A further object is to provide such a system which is compatible with the existing KARTRAK system and equipment.

SUMMARY OF THE INVENTION

The above and other beneficial objects and advantages are attained in accordance with the present invention by providing an improved label for use in a system for the identification of objects wherein the label is affixed to an object to be identified. The label comprises an array of modules of colored elements arranged in a code to define data unique to the object and means on the label for altering the color of at least a portion of one of the modules in response to a changed condition within the object.

DETAILED DESCRIPTION OF THE PREFERRED EMBODIMENT

Figure 1:
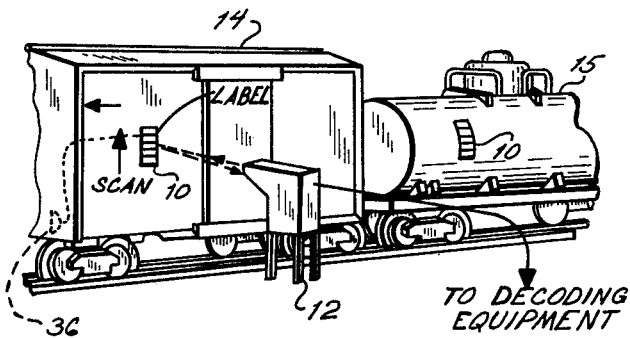
FIG. 1 is a diagrammatic representation of the improved system and label of the present invention on associated railroad cars.
Figure 2:
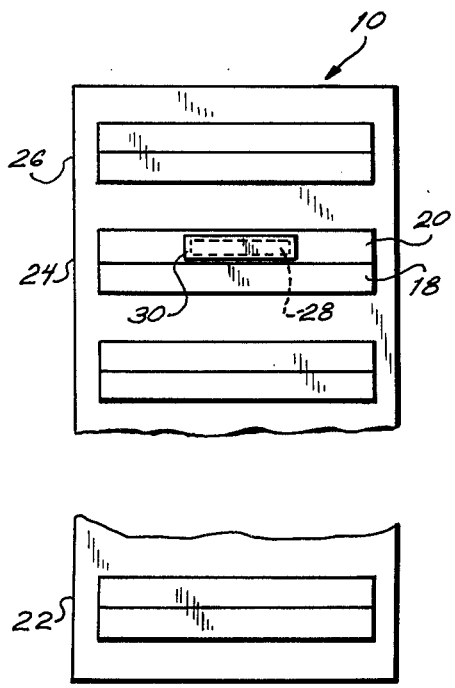
FIG. 2 is a front elevational view of a label in accordance with the present invention.
Figure 3:
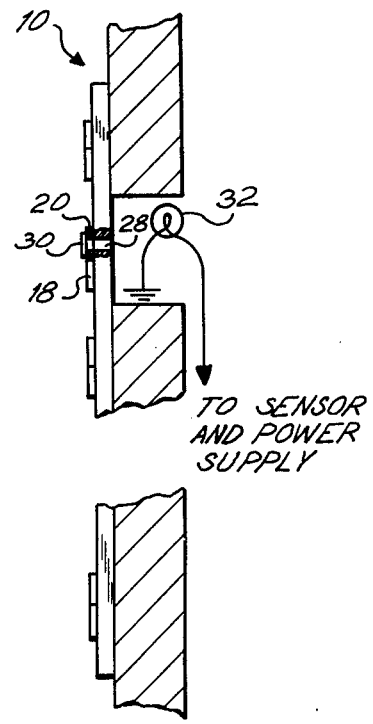
FIG. 3 is a side elevational view of the label of FIG. 2.

As stated, the present invention comprises an improvement on the automatic identification system set forth in U.S. Pat. No. 3,225,177 and the details and disclosure of that patent are incorporated herein by reference. Suffice it to say, the basic system consists of three major components: a label 10 which attaches to the object to be identified; a scanner 12 which reads the label; and a decoder (not shown) which interprets the information from the scanner so as to provide useful information as to the identity of a railroad car 14 or other object passing before the scanner.

As discussed in detail in the above noted patent, the label 10 comprises an array of modules of fields of colored elements arranged in code to define data unique to the object. The AAR approved label is 10 inches wide by 22.5 inches high and contains 13 modules 16 arranged vertically one on top of the other and extending horizontally across the label. Each of the modules consists of two horizontal stripes 18 and 20 which may be colored blue, orange, white (blue and orange) or black (neither blue nor orange). The stripes are formed of a retroreflective material. In addition to carrying coded car identification equipment, each of the labels includes control information comprising a start signal module 22, a stop signal module 24 and a validity check module 26.

Scanner 12 is also discussed in detail in the above cited patent. Suffice it to say for the present application, the scanner contains a lamp and a rotating mirrored wheel which causes a light beam from the lamp to scan the label on a passing car vertically from bottom to top. Because of the retroreflective nature of the label modules, the reflected light is directed back to the scanner where it is split by a dichroic mirror and passed through red and blue filters to impinge on photodetectors. The photodetectors generate a train of pulses which are subsequently fed to the decoding equipment for deciphering as to the identity of the passing car.

As stated before, there are at least three modules that are fixed on all labels. Namely, the start, stop and validity check modules. In the AAR approved label, reading from bottom to top, the start module is orange and blue, the stop module is blue and orange, and the validity check module is white and black.

In accordance with the present invention, it is proposed that means be provided for monitoring the object being identified for a particular condition. For example, the temperature within refrigerator car 14 may be critical or the pressure within pressurized car 15 may be critical and their conditions are monitored by means of a thermostat or other appropriate sensor. If the critical condition is met, the color of at least a portion of at least one of the modules is changed from its normal color so that when the scanner detects the changed condition, an alarm signal can be generated. While theoretically any color stripe on any module of a label can be utilized for this monitoring purpose, in the following description the blue stripe of the stop module will be used. It should be realized, however, that each of the modules can take on any one of 16 combinations. Since only 10 of the combinations are utilized (to represent the digits 0 through 9) each module has six spare combinations which can be used for purposes of the present application.

An aperture 28 is cut in the label 10 in the chosen module or modules. In the first embodiment of the present invention, a nonretroreflective colored filter 30 is positioned over the aperture. The color of the filter 30 is chosen opposite from the color of the portion of the module containing the aperture. Thus, for example, if the aperture is cut in the orange portion 20 of the stop module 24, a blue filter 30 would be positioned over the aperture. A lamp 32 is provided behind the aperture. The lamp is connected through a power supply 34 to a sensor 36 adapted to detect the condition being monitored. Thus, in the example illustrated in FIG. 1, the sensor 36 may comprise a thermostat within the refrigerated car. In the event the temperature within the car exceeds a certain limit, the contacts of the thermostat will close causing lamp 32 to glow. Therefore, when the scanner 12 reads module 24 on label 10 it will see it as one blue stripe and one white stripe rather than a blue stripe and orange stripe module. The associated decoder would thus be programmed to generate an appropriate alarm signal in response to the blue stripe, white stripe signal for module 24 instead of the normal signal generated for this module. If conditions within the car are proper, the scanner 12 would not pick up any blue light added to the organe field 20 of module 24 (thus making it appear as white to the scanner) since filter 30 is not retroreflective. Thus, in the event of normal conditions, the scanner would read module 24 as being blue and orange — the normal colors for this module. Thus, each time the scanner reads the label for identification information, it also makes a determination that conditions within the car are normal. In a successful practice of the invention, a 1 x ½ inch aperture was cut in an orange module of a conventional KARTRAK label. A blue filter — identical with the filter within the scanner was placed over the aperture and a 60 watt bulb was positioned behind the aperture. With the bulb off, the KARTRAK equipment read the module as orange. With the blub on, the KARTRAK equipment read the module as white (orange and blue combined).

Figure 5:
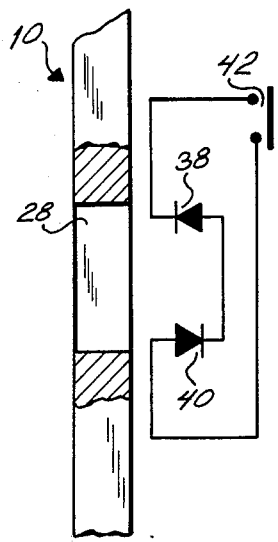
FIGS. 4 and 5 are schematic representations of the present invention.
Figure 4:
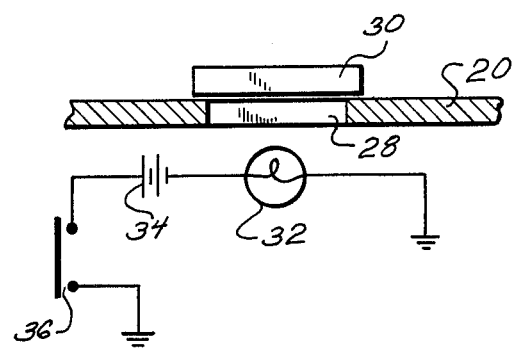

The above described embodiment requires a power source to energize lamp 32. Normally, this is not a problem in the railroad industry since most cars that carry critical loads, such as refrigertor cars, are provided with power. However, the need for an outside power supply may pose a problem in non-railroad usages. This problem is solved in an alternate embodiment of the present invention depicted in FIG. 5.

In this alternate embodiment, a label 10 is provided with an aperture 28 as before. A solar cell 38 is positioned behind the aperture connected to a light emitting diode 40 and the load monitoring switch 42. The diode 40 is so constructed as to emit on a specific wavelength that adds the proper amount and color of light to make the color alteration discussed above. Accordingly, an orange light emitting diode would be provided on a blue portion of a module while a blue light emitting diode would be provided on the orange portion of the module. When conditions being monitored are normal, switch 42 remains open and diode 40 emits no light. If an abnormal condition develops, switch 42 closes. When the light from scanner 12 impinges on diode 38, electrical power is generated which causes diode 40 to emit light resulting in the alteration of at least a portion of the module color. This alteration is detected by the scanner and decoder as before. A clear filter 44 may be provided across the aperture to collect dust and dirt to ensure that the light from the diode 40 decays evenly with the retroreflected light from the remainder of the label as dirt and grime build up on the car.

While the above discussion is directed at an AAR approved KARTRAK label, it should be realized that the basic principle of the present application can apply equally as well to other optical to electronic translating object identification systems. Accordingly, the present invention should not be limited to the disclosed embodiment but rather should be construed in accordance with the appended claims.

Having thus described the invention, what is claimed is:

1. In a system for the identification of objects wherein the system is of the type comprising: a label affixed to each object to be identified, said label comprising an array of modules of colored elements arranged in a code to define data unique to the object and a scanning station including optical to electronic translating means adapted to scan each element of said array and generate an electronic signal in response to the color of each module scanned, the improvement comprising: means on said label for altering the color of at least a portion of one of said modules in response to a condition within said object and means at said station for detecting said altered module.

2. The system in accordance with claim 1 wherein said at least one module is of a first color and said means includes an aperture in said module, a light source of a second color positioned behind said aperture, sensing means within said object for determining said condition, and means interconnecting said light source and sensing means completing a circuit therebetween.

3. The system in accordance with claim 1 wherein said label array of modules is arranged in a base four code comprising a first color, a second color, both said first and second colors and neither of said first nor second colors.

4. The system in accordance with claim 3 wherein said scanner generates a first signal corresponding to the color of said one module when said means are not activated and a second signal corresponding to the presence of both said first and second colors when said means are activated.

5. The system in accordance with claim 1 wherein said label modules are formed of retroreflective material.

6. The system in accordance with claim 5 including at least one module of a first color, an aperture in said one module, a nonretroreflective light source of a second color positioned behind said aperture, a power source, sensing means within said object for determining said condition, and means interconnecting said light source and power source responsive to said sensing means.

7. The system in accordance with claim 1 wherein said scanner is of the type adapted to direct light on said label and said altering means includes first means for connecting said light into electrical energy and second means powered by said energy.

8. The system in accordance with claim 7 wherein said labels are formed of retroreflective material and said second means includes an aperture in said one module, a nonretroreflective light source of a second color positioned behind said aperture, sensing means within said object for determining said condition, and means interconnecting said light source and sensing means completing a circuit therebetween.

9. The system in accordance with claim 8 wherein said light source comprises a light emitting diode.

10. A label for use in a system for the identification of objects, said label being affixed to an object to be identified and comprising: an array of modules of colored elements arranged in a code to define data unique to the object and means on said label for altering the color of at least a portion of one of said modules in response to a condition within said object.

11. The label in accordance with claim 10 wherein said at least one module is of a first color and said means includes an aperture in said module, a light source of a second color positioned behind said aperture, and means for interconnecting said light source with sensing means within said object for determining said condition.

12. The label in accordance with claim 10 wherein said array of modules is arranged in a base four code comprising a first color, a second color, both said first and second colors and neither of said first nor second colors.

13. The label in accordance with claim 12 wherein said module appears to an associated scanner as being of a first color when said altering means are not activated and said module appears to an associated scanner as being of both said first and second colors when said altering means are activated.

14. The label in accordance with claim 10 wherein said modules are formed of retroreflective material.

15. The label in accordance with claim 14 including at least one module of a first color, an aperture in said module, a nonretroreflective light source of a second color positioned behind said aperture and means for interconnecting said light source with a power source in response to sensing means within said object for determining said condition.

16. The label in accordance with claim 10 wherein said altering means includes first means for converting incident radient energy into electrical and second means powered by said electrical energy.

17. The label in accordance with claim 16 wherein said modules are formed of retroreflective material and said second means includes an aperture in said one module, a nonretroreflective light source of a second color positioned behind said aperture and means for interconnecting said light source and sensing means within said object for completing a circuit therebetween.

18. The label in accordance with claim 17 wherein said light source comprises a light emitting diode.

* * * * *